March 1, 1955  C. CONOVER  2,703,116
FOUR-MOTION RECIPROCATING POWER-SAW ATTACHMENT
Original Filed April 29, 1952
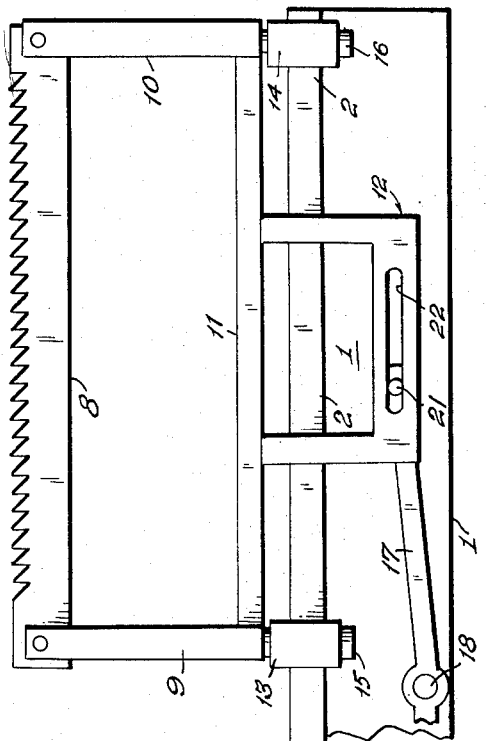
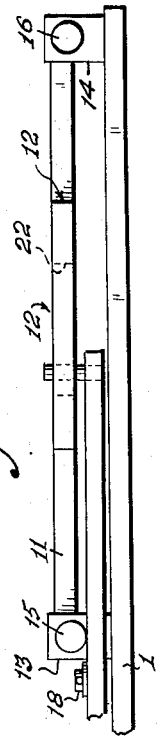
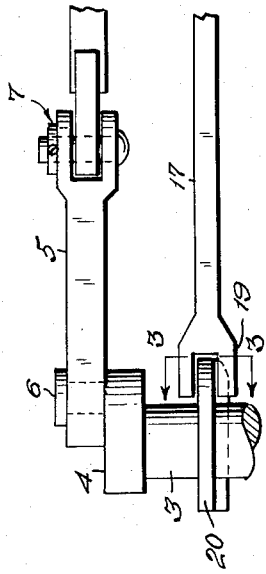
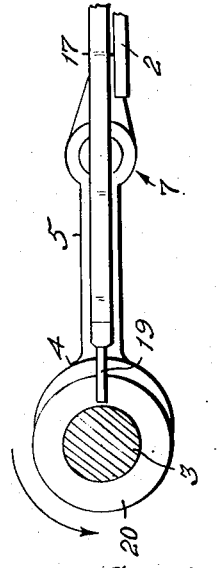
INVENTOR.
Courtney Conover
BY
Henry C. Parker
Attorney.

United States Patent Office 2,703,116
Patented Mar. 1, 1955

2,703,116

FOUR-MOTION RECIPROCATING POWER-SAW ATTACHMENT

Courtney Conover, Silver Spring, Md.

Original application April 29, 1952, Serial No. 285,000. Divided and this application April 29, 1954, Serial No. 426,527

2 Claims. (Cl. 143—63)

This invention relates to four-motion reciprocating power-saw attachment; and it comprises a saw attachment adapted to be connected to a rotary source of power, such as the rotary power shaft of a mowing machine or the like, said attachment comprising a stationary base plate which may be the plate which supports and guides the cutter bar of the mowing machine, a sliding bar having a longitudinal reciprocating stroke mounted for reciprocating motion on said base plate, means for converting the rotary motion of said power shaft to reciprocating motion, said means being operatively attached to said sliding bar to produce longitudinal reciprocation thereof, spaced-parallel slide bearings mounted transversely on said sliding bar, a saw frame including a saw blade mounted in said bearings with the saw blade at one side of but substantially parallel with said sliding bar, a lever arm pivotally mounted on said base plate, means mounted on said rotary power shaft for causing said lever arm to oscillate about its pivot, and a sliding connection between the saw frame and one end of said lever arm adapted to cause transverse reciprocation of the saw frame in said transversely mounted slide bearings upon oscillation of the lever arm; the said parts being so constructed and arranged that, at one end of the longitudinal reciprocating stroke of the sliding bar and attached saw blade, the lever arm is oscillated in such direction that the saw frame is moved transversely away from the base plate into sawing position and the saw frame and saw blade are held in said sawing position until completion of the said longitudinal stroke and that the lever arm is then oscillated in the reverse direction and that the saw frame and saw blade are thereby moved towards the base plate into idling position and held in said position during the returning longitudinal stroke of the sliding bar and attached saw frame; all as more fully hereinafter set forth and as claimed.

This application is a division of my copending application, Serial No. 285,000, filed April 29, 1952, and is filed to cover a specific embodiment of my saw attachment which is claimed broadly in the said parent application.

An object of the present invention is to supply a reciprocating saw attachment for power driven mowing machines and the like which are provided with rotary power shafts.

Another object is to provide a saw attachment which can be readily mounted on a power driven machine and connected to its rotary power shaft.

A further object is to provide a saw attachment in which a wood saw reciprocates with a power stroke in one direction and in which the saw is pulled and held away from the work until the beginning of the power stroke at which time it is pressed against the work and held in this position until the end of the power stroke.

Still another object is to provide a saw attachment which can be used, when attached to a power driven machine, quickly to cut brush, scrub and small trees from land which requires clearing.

Reciprocating saws, in comparison with circular saws and chain saws capable of doing the same work, are generally safer to use, lighter in weight, more easily replaced when dulled, more economical in power and more easily kept in good working condition. Further a reciprocating saw is somewhat less likely to be damaged when used under adverse working conditions. In the past, most power driven reciprocating saws have operated with long strokes and have been designed to cut in both directions of their reciprocating motions. This has resulted in considerable difficulties from binding since the saw dust tends to become trapped between the saw and the cut when saws are operated in this manner.

I have found that these difficulties can be eliminated by the use of a saw which cuts in one direction only and is pulled away from the work on its return stroke. This manner of operation causes the saw dust to be discharged from the cut promptly and from one side of the cut only. The saw dust is not pushed backward and forward in the middle of the cut as in the conventional two-way saws, but is intermittently moved in the direction of the cutting stroke. Another advantage obtained in employing a saw with an operating and an idling stroke is that the saw teeth can be shaped for cutting wood in one direction only and hence can be formed for maximum efficiency of cutting.

I have also found that an efficient reciprocating saw of the type described can be made as a convenient attachment for the conventional mowing machine. In its less expensive form this saw attachment is designed to operate with a short stroke of which the length is a small fraction of the length of the saw and hence a small fraction of the possible width of cut. When constructed in this fashion it is possible to make use of the reciprocating mechanism which drives the cutter bar of the conventional mowing machine. It is also possible with but little added expense to supply with the saw attachment a reciprocating mechanism having a stroke of substantially any desired length which mechanism can be attached to any machine provided with a rotary power shaft.

The attachment has been found particularly well adapted for use in sawing applications wherein the saw is operated at a relatively great distance from the automotive carrier and the source of power. It is particularly adapted for use in the cutting of bushes and trees which branch out close to the ground and for cutting bushes and trees on the bank of a highway where they may be at a higher or lower level than the road bed or on a slope.

My invention can be explained in greater detail by reference to the accompanying drawing which shows, more or less diagrammatically, an operative embodiment of my saw attachment. In this showing Fig. 1 is a plan view of a saw attachment which makes use of a cam and lever attachment to operate the saw frame from the rotary power shaft of a mowing machine, for example, Fig. 2 is a side view of the attachment shown in Fig. 1 taken from the bottom of Fig. 1, while Fig. 3 is a front or edgewise view of the cam employed to reciprocate the saw in transverse direction, taken along the line 3—3 of Fig. 1.

In the various views like parts are designated by the same reference numerals. Referring first to Figs. 1 and 2, reference numeral 1 designates a steel base plate, such as is used as the main supporting base for the cutter bar of the conventional mowing machine in which mowing is effected by means of reciprocating knives, while 2 designates a sliding bar which replaces the conventional sliding cutter bar and which slides in conventional supports and guides not shown in the drawing. Power is furnished to the sliding bar from the main rotary power shaft 3 of the mowing or other machine through the crank 4, pitman 5, crank pin 6 and coupling shown generally at 7, this producing a longitudinal reciprocating motion of the sliding bar. The saw blade 8 is attached at its ends to the outer ends of two arms 9 and 10 which are connected at their inner ends by a cross arm 11. An off-set three sided frame shown generally at 12 is rigidly attached to the inner side of the cross arm. Thus the saw 8, the arms 9 and 10, the cross arm 11 and the side frame 12 form together a rigid frame for supporting and guiding the saw. This saw frame is slidably mounted on the reciprocating bar 2 by means of transversely mounted slide bearings 13 and 14 in which the shafts 15 and 16 are journaled, the latter forming continuations of the arms 9 and 10. Thus the saw frame is mounted for longitudinal reciprocation with the bar 2 as well as for transverse reciprocation during which the saw is moved into operating position away from its base during its power stroke and then into inoperative position upon the return stroke.

The means provided in Figs. 1 and 2 for causing the transverse reciprocating motion of the saw frame comprises the lever arm 17 which is pivoted to the base 1 at 18. At its inner end this lever is provided with a bifurcated cam follower 19 which cooperates with cylindrical cam 20 mounted on the power shaft 3. This cam is formed in two sections which are offset from each other, as shown in Fig. 3 and which cause the lever 17 to oscillate back and forth in a horizontal plane about the pivot 18. The opposite end of the lever is provided with a pin 21 which engages a longitudinal slot 22 provided in said frame 12.

The cam 20 as shown in Fig. 3 is formed in such fashion that at the start of the power stroke of the saw, which is directed to the left side of Figs. 1 and 2 of the drawing, the saw and its frame is quickly moved into its operating position towards the work and away from the base and is held in this position as long as the saw continues to move towards the left. Upon the return stroke the saw is quickly returned to its inoperative position away from the work and remains in this position to complete the cycle. Figures 1 and 2 show the saw approximately at the end of its inoperative or idling stroke.

One important feature of my saw attachment is that the saw is pressed against the work only during its operating stroke while during its idling stroke it is lifted away from the work. With this type of motion the saw dust always moves in one direction, towards the left in Figs. 1 and 2 of the drawing, and as a result there is no opportunity for the saw dust to cause binding of the saw in its cut.

While I have described what I consider to be the more advantageous embodiments of my saw attachment it is evident, of course, that various modifications can be made in the specific constructions which have been described without departing from the purview of this invention. Thus while I have found that my saw operates satisfactorily with a relatively short operating stroke of the order of one inch or even less, it is evident that the length of operating stroke can be increased readily by merely changing the crank 4 and pitman 5 shown in Figs. 1 and 2.

My saw can be designed to operate a considerable distance from the rotary power shaft which furnishes its power merely by increasing the lengths of the pitman, the base plate and the lever arm. The base plate can, of course, be hinged to the tractor or mowing machine to which they are attached in manner identical to that employed in attaching the cutter bar to the conventional mowing machine. This enables my saw to make cuts at an angle to the horizontal. Other modifications of this invention which fall within the scope of the following claims will be immediately evident to those skilled in the art.

What I claim is:

1. A saw attachment adapted to be attached to and driven by a power driven machine equipped with a rotary power shaft, which comprises in combination an elongated base plate adapted to be attached to said machine, a sliding bar having a longitudinal reciprocating stroke mounted for reciprocation on said base plate, means for converting the rotary motion of said power shaft to reciprocating motion, said means being operatively attached to said sliding bar to produce longitudinal reciprocation thereof, spaced-parallel slide bearings mounted transversely on said sliding bar, a saw frame including a saw blade mounted in said slide bearings with the saw blade at one side of but substantially parallel with said sliding bar, a lever arm pivotally mounted on said base plate, means mounted on said rotary power shaft for causing said lever arm to oscillate about its pivot, and a connection between the saw frame and one end of said lever arm adapted to cause transverse reciprocation of the saw and its frame in said transversely mounted slide bearings upon oscillation of the lever arm; said parts being so constructed and arranged that, at one end of the longitudinal reciprocating stroke of the sliding bar and attached saw blade, the lever arm is oscillated in such direction that the saw frame is moved transversely away from the base plate into sawing position and the saw frame and saw are held in said sawing position until substantial completion of the said longitudinal stroke, and that the lever arm is then oscillated in the reverse direction and that the saw frame and saw blade are thereby moved towards the base plate into idling position and held in said position during the returning longitudinal stroke of the sliding bar and attached saw frame.

2. The saw attachment of claim 1 wherein the means for oscillating the lever arm comprises a cam mounted on said rotary power shaft and a cooperating cam follower mounted at one end of said lever arm.

References Cited in the file of this patent

UNITED STATES PATENTS

| 616,220 | Wilkin | Dec. 20, 1898 |
| 1,636,729 | Yarrington | July 26, 1927 |
| 2,503,605 | Abgarian | Apr. 11, 1950 |